(12) United States Patent
Suzuki

(10) Patent No.: US 12,473,071 B2
(45) Date of Patent: Nov. 18, 2025

(54) FRAME ASSEMBLY AND METHOD FOR MANUFACTURING FRAME ASSEMBLY

(71) Applicant: AERONEXT INC., Shibuya-ku (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 0 days.

(21) Appl. No.: 18/556,855

(22) PCT Filed: Mar. 14, 2022

(86) PCT No.: PCT/JP2022/011413
§ 371 (c)(1),
(2) Date: Oct. 23, 2023

(87) PCT Pub. No.: WO2022/224630
PCT Pub. Date: Oct. 27, 2022

(65) Prior Publication Data
US 2024/0217644 A1    Jul. 4, 2024

(30) Foreign Application Priority Data

Apr. 23, 2021  (WO) .................. PCT/JP2021/016536

(51) Int. Cl.
*B64C 1/06* (2006.01)
*B64U 20/70* (2023.01)

(52) U.S. Cl.
CPC .............. *B64C 1/061* (2013.01); *B64U 20/70* (2023.01)

(58) Field of Classification Search
CPC ........ B64U 10/10; B64U 10/13; B64U 20/70; B64F 5/10; B64C 1/061
USPC ........................................ 244/119; 52/220.1
See application file for complete search history.

(56) References Cited

U.S. PATENT DOCUMENTS

| | | | | |
|---|---|---|---|---|
| 3,381,921 A | * | 5/1968 | Mcdonough | B64D 9/003 414/536 |
| 5,069,318 A | * | 12/1991 | Kulesha | B64C 27/006 188/377 |
| 5,927,650 A | * | 7/1999 | Huber | B64D 1/10 414/532 |
| 7,073,994 B2 | * | 7/2006 | Huber | B64C 1/20 410/92 |
| 9,139,310 B1 | * | 9/2015 | Wang | B60L 58/12 |
| 9,764,835 B1 | * | 9/2017 | Kimchi | B64U 30/20 |

(Continued)

FOREIGN PATENT DOCUMENTS

| | | | |
|---|---|---|---|
| CN | 105059526 A | 11/2015 | |
| CN | 107697280 A | * 2/2018 | ............. B64C 1/069 |

(Continued)

OTHER PUBLICATIONS

International Search Report dated Jul. 20, 2021 for International Application No. PCT/JP2021/016536.

(Continued)

*Primary Examiner* — Joshua E Rodden
(74) *Attorney, Agent, or Firm* — HAUPTMAN HAM, LLP

(57) ABSTRACT

To stabilize a frame of a flight body, a frame assembly for a flying body includes a first frame member extending in at least two parallel and first directions, a second frame member extending in a second direction perpendicular to said first direction, and a fixing member fixed to each of the first and second frame members, wherein at least one of the fixing members has an opening.

11 Claims, 16 Drawing Sheets

(56) References Cited

U.S. PATENT DOCUMENTS

| | | | | |
|---|---|---|---|---|
| 10,099,784 B1* | 10/2018 | Nilson | | B64U 20/60 |
| 10,124,888 B2* | 11/2018 | Pounds | | B64U 50/19 |
| 10,183,747 B1* | 1/2019 | Longhi | | B64C 25/54 |
| 10,400,840 B2* | 9/2019 | Davis | | F16F 3/00 |
| 10,538,316 B2* | 1/2020 | Chen | | B64U 30/29 |
| 10,647,404 B2* | 5/2020 | Sugaki | | B64C 27/56 |
| 2008/0113191 A1* | 5/2008 | Berg | | B29C 65/5021 428/347 |
| 2009/0008499 A1* | 1/2009 | Shaw | | B64U 80/80 244/17.23 |
| 2014/0145026 A1 | 5/2014 | Skjersaa | | |
| 2014/0263822 A1* | 9/2014 | Malveaux | | B64U 20/83 244/17.23 |
| 2016/0101850 A1* | 4/2016 | Lin | | A63H 27/12 244/17.23 |
| 2017/0210470 A1* | 7/2017 | Pardell | | H02S 40/10 |
| 2017/0291677 A1* | 10/2017 | Harris | | B64U 10/13 |
| 2018/0118322 A1 | 5/2018 | Harris | | |
| 2018/0194484 A1* | 7/2018 | Livieratos | | B64U 50/11 |
| 2018/0327074 A1* | 11/2018 | Mills | | B64C 1/18 |
| 2019/0002124 A1* | 1/2019 | Garvin | | B64D 47/08 |
| 2020/0079488 A1* | 3/2020 | Messori | | B64D 45/00 |
| 2021/0001974 A1 | 1/2021 | Kunii et al. | | |
| 2022/0324589 A1* | 10/2022 | Cohen | | B64U 80/25 |
| 2023/0202686 A1* | 6/2023 | Suzuki | | B64U 50/13 244/6 |
| 2023/0406550 A1* | 12/2023 | Lu | | B64U 10/13 |
| 2024/0278943 A1* | 8/2024 | Suzuki | | B64U 30/20 |
| 2024/0308688 A1* | 9/2024 | Ratajczak | | B64D 31/00 |

FOREIGN PATENT DOCUMENTS

| | | | | |
|---|---|---|---|---|
| CN | 210618446 U | | 5/2020 | |
| CN | 113320677 A | | 8/2021 | |
| CN | 114044128 A | * | 2/2022 | B64C 19/02 |
| JP | 2017193208 A | | 10/2017 | |
| JP | 2019191585 A | | 10/2019 | |
| KR | 2021064705 A | * | 6/2021 | B64C 27/08 |
| WO | WO-2021074986 A1 | * | 4/2021 | B64C 39/02 |

OTHER PUBLICATIONS

First Office Action dated Oct. 11, 2024 for Chinese Patent Application No. 202210429963.8.

Office Action in CN application No. 202210429963.8, dated Apr. 25, 2025, 12pp.

* cited by examiner

FRAME ASSEMBLY AND METHOD FOR MANUFACTURING FRAME ASSEMBLY

CROSS-REFERENCE TO RELATED APPLICATION

This application is a national stage application, filed under 35 U.S.C. § 371, of International Patent Application No. PCT/JP2022/011413, filed on Mar. 14, 2022, which claims priority to International Patent Application No. PCT/JP2021/016536, filed on Apr. 23, 2021, which is incorporated by reference herein in its entirety.

TECHNICAL FIELD

The present disclosure relates to frame assemblies and methods of manufacturing frame assemblies.

BACKGROUND ART

In recent years, industries have been developing flight bodies such as drones and unmanned aerial vehicles (UAVs; hereinafter collectively referred to as "flight bodies"). In many industries, flight bodies are connected to equipment, cargo/load, and other objects for flight. For example, in industries such as filming, security, survey, and inspection, cameras, microphones, and other sensors are connected. In industries such as logistics and rescue, cargo/load and people are carried on board. In the industrial use of flight vehicles, the flight body and the equipment, cargo/load, or other objects to be carried must be stable.

In view of this situation, Patent Literature 1 seeks to stabilize the flight body when carrying photographic equipment, etc. (see Patent Literature 1).

PRIOR ART LIST

Patent Literature

[Patent Literature 1] JP2019191585A1

SUMMARY OF THE INVENTION

Technical Problem

However, Patent Literature 1 cannot overcome the instability caused by frame curvature and torsion.

The purpose of this disclosure is to provide a technology that can stabilize the frame of a flight body.

Technical Solution

The principal invention of the present disclosure to solve the above problem is, a frame assembly for a flight body, comprising: at least two parallel first frame members extending in a first direction; a second frame member extending in a second direction perpendicular to the first direction; and a fixing member fixed to each of the first and second frame members.

Other issues disclosed in this application and their solutions will be clarified in the "Embodiments of the Invention" section and in the drawings.

Advantageous Effects

According to the present disclosure, a frame assembly and a method for manufacturing a frame assembly can be provided that can stabilize the frame of a flight body.

EMBODIMENT FOR IMPLEMENTING THE INVENTION

Figure 1:
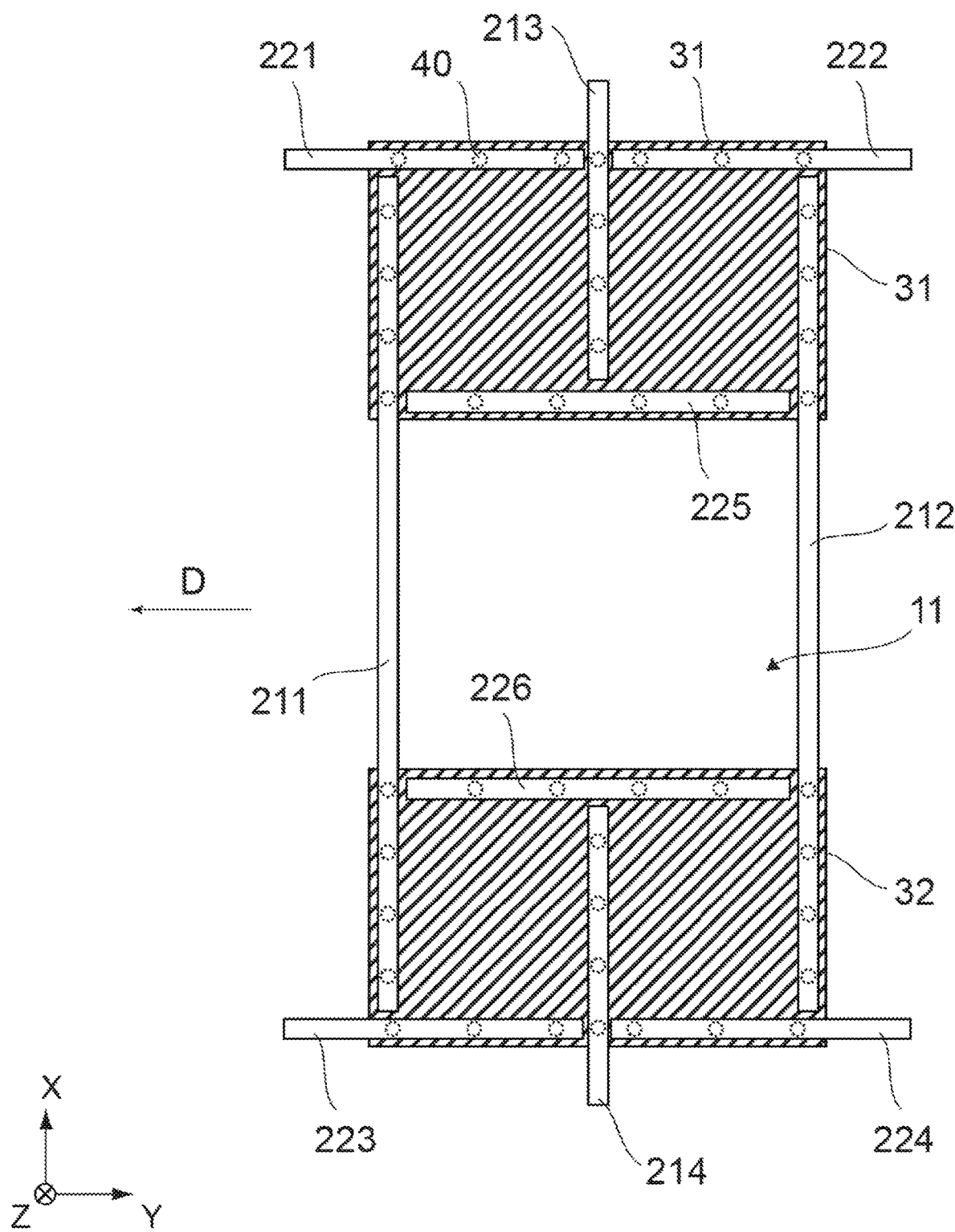
FIG. 1 shows a top view of a frame assembly of this embodiment.

The contents of this embodiment of the disclosure are described in the following list. A frame assembly and a method for manufacturing a frame assembly according to this embodiment of the disclosure comprise the followings:

[Item 1]
A frame assembly for a flight body, comprising:
at least two parallel first frame members extending in a first direction;
a second frame member extending in a second direction perpendicular to the first direction; and
a fixing member fixed to each of the first and second frame members,
wherein at least one of the fixing members has an opening.

[Item 2]
The frame assembly of item 1,
wherein both of the fixing members have openings.

[Item 3]
The frame assembly as in item 1 or 2,
wherein the fixing member is plate-shaped.

[Item 4]
The frame assembly of any one of items 1 to 3, further comprising:
a reinforcing member having a shape that adheres to both the fixing member and either the first or second frame member.

[Item 5]
The frame assembly of item 4,
wherein the reinforcing member is a resin mixed with fibers.
[Item 6]
The frame assembly according to item 4,
wherein the reinforcing member is an adhesive that becomes rigid when cured.
[Item 7]
The frame assembly according to item 4,
wherein the reinforcing member is an adhesive that forms a resilient film when cured.
[Item 8]
The frame assembly as in item 6 or 7,
wherein the adhesive is a mixture of fibers.
[Item 9]
The frame assembly as in any one of items 1 or 8,
wherein at least one of the two openings has a mounted part therein.
[Item 10]
The frame assembly according to item 9,
wherein the mounted part is a battery case.
[Item 11]
The frame assembly as in item 9 or 10,
wherein the mounting parts are fixed to one of the two fixing members and straddle within the two openings.
[Item 12]
The frame assembly as in item 9 or 10,
wherein the mounting parts are provided between the two fixing members, secured to the lower fixing member and provided within an opening in the lower fixing member.
[Item 13]
The frame assembly as in item 11 or 12,
wherein the mounting parts are provided at an angle with respect to a direction defined by a plane comprising the first frame member and the second frame member and an axis orthogonal to that plane.
[Item 14]
A method of manufacturing a frame assembly for a flight body, comprising:
fixing fixing members to each of at least two parallel first frame members extending in a first direction and a second frame member extending in a second direction perpendicular to the first direction.

<Outline of the First Embodiment of the Frame Assembly 1>

The following is a description of a frame assembly 1 for a flight body in accordance with one embodiment of this disclosure. This embodiment of the frame assembly 1 has a structure that fixes a fixing member to a plurality of frame members.

The material of the frame member is, for example, CFRP (Carbon Fiber Reinforced Plastic). The material of the fixing member can be CFRP as well. The rigidity of the frame assembly 1 can be secured by making the fixing members plate-like and fixing them to the multiple frame members. The rigidity of the frame assembly 1 can also be secured by passing the rod-shaped fixing members between the multiple frame members as braces.

The fastening members can be fastened to the frame members using screws, rivets, etc. (hereinafter collectively referred to as fastening fixtures). This makes it possible to omit mechanisms such as clamps and thus reduce the weight of the frame assembly 1. Fastening fixtures can be placed at two or more locations on one frame member.

In addition, the fixing member can be plate-shaped and the frame member can be held between two fixing members. This can ensure the rigidity of the frame assembly 1 in the vertical direction (the direction of pinching). One of the plate-shaped fixing members can be provided with an opening. This makes the frame assembly 1 lighter and also facilitates the placement of various parts, etc. within the opening.

<Configuration of the First Form of Frame Assembly 1>

Figure 3:
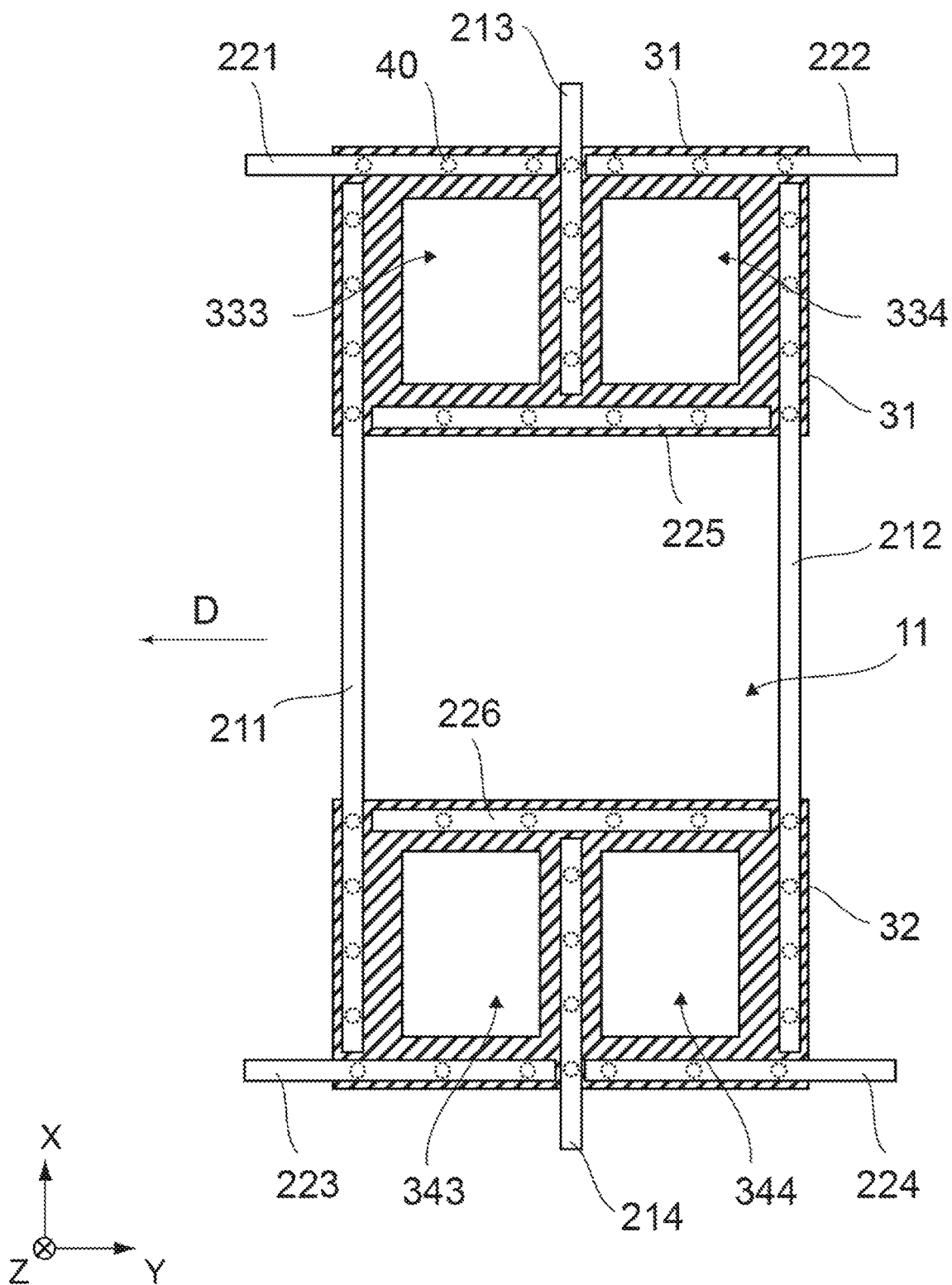
FIG. 3 shows a top view of the frame assembly of this embodiment.

FIG. 1 and FIG. 3 are top views of a frame assembly 1 of this embodiment. The example frame assembly 1 in FIG. 1 and FIG. 3 can be used for a flight body that flies in the direction of arrow D as the forward direction. The frame assembly 1 has two parallel or substantially parallel frame members 211 and 212 extending in the left-right direction perpendicular to the front-back direction. At one end of frame members 211 and 212, frame members 221 and 222 extend in the same or substantially the same straight line in the front-back direction and are parallel or substantially parallel to a frame member 225. At the other end of frame members 211 and 212, frame members 223 and 224 extend on the same or substantially the same straight line in the front-back direction and parallel or substantially parallel to frame member 226. In addition, frame members 225 and 226 are provided between frame members 211 and 212, spaced apart from the ends of frame members 213 or 214 and extending parallel or substantially parallel in the front-back direction. The frame members 213 and 214 may extend from the frame members 225 and 226, respectively, in the same or substantially the same straight line in the left-right direction toward the outside of the frame assembly 1. The frame members described above need not necessarily be parallel or substantially parallel to each other, as long as they extend in parallel, but if the frame members perpendicular to the parallel frame members are fixed to each other by the fixing members 31 and 32 described below, they are more firmly fixed.

Plate-shaped fixing members 31 and 32 are arranged at the left and right ends of the frame assembly 1. The fixing members 31 are fixed to the frame members 211, 212, 213, 221, 222, and 215, respectively, by fastening fixtures 40. The fixing member 31 is fastened to frame members 211, 212, 213, 221, 222, and 215, respectively, in multiple locations by fastening fixtures. Similarly, the fixing member 32 is fixed to frame members 211, 212, 214, 223, 224, and 216 at multiple locations each by fastening fixtures 40. An opening 11 is formed in the center of the frame assembly 1. When the frame assembly 1 is used in a flight body, various payloads can be placed in this opening 11.

Figure 2:
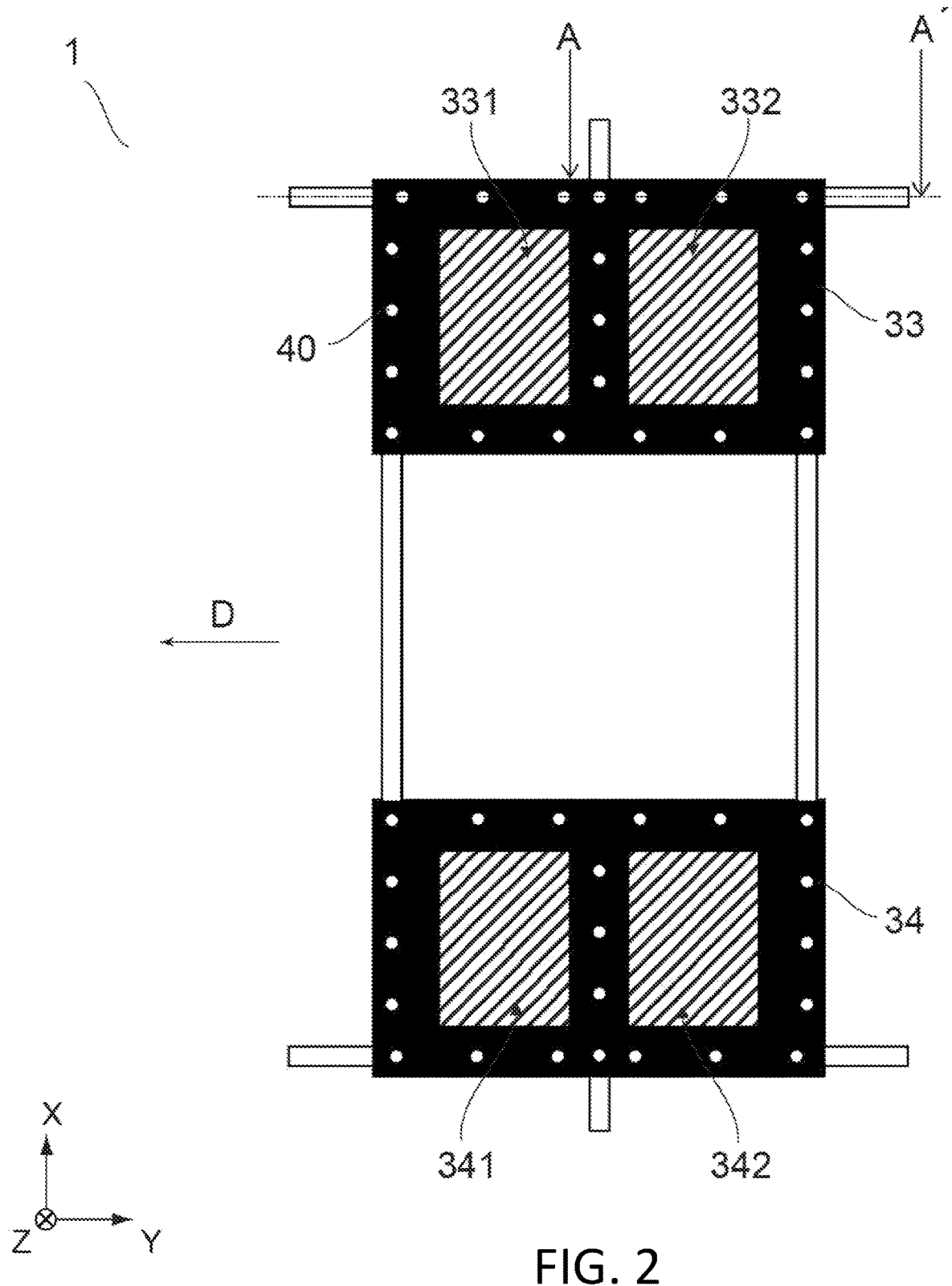
FIG. 2 shows a top view of the frame assembly of FIG. 1.
Figure 4:
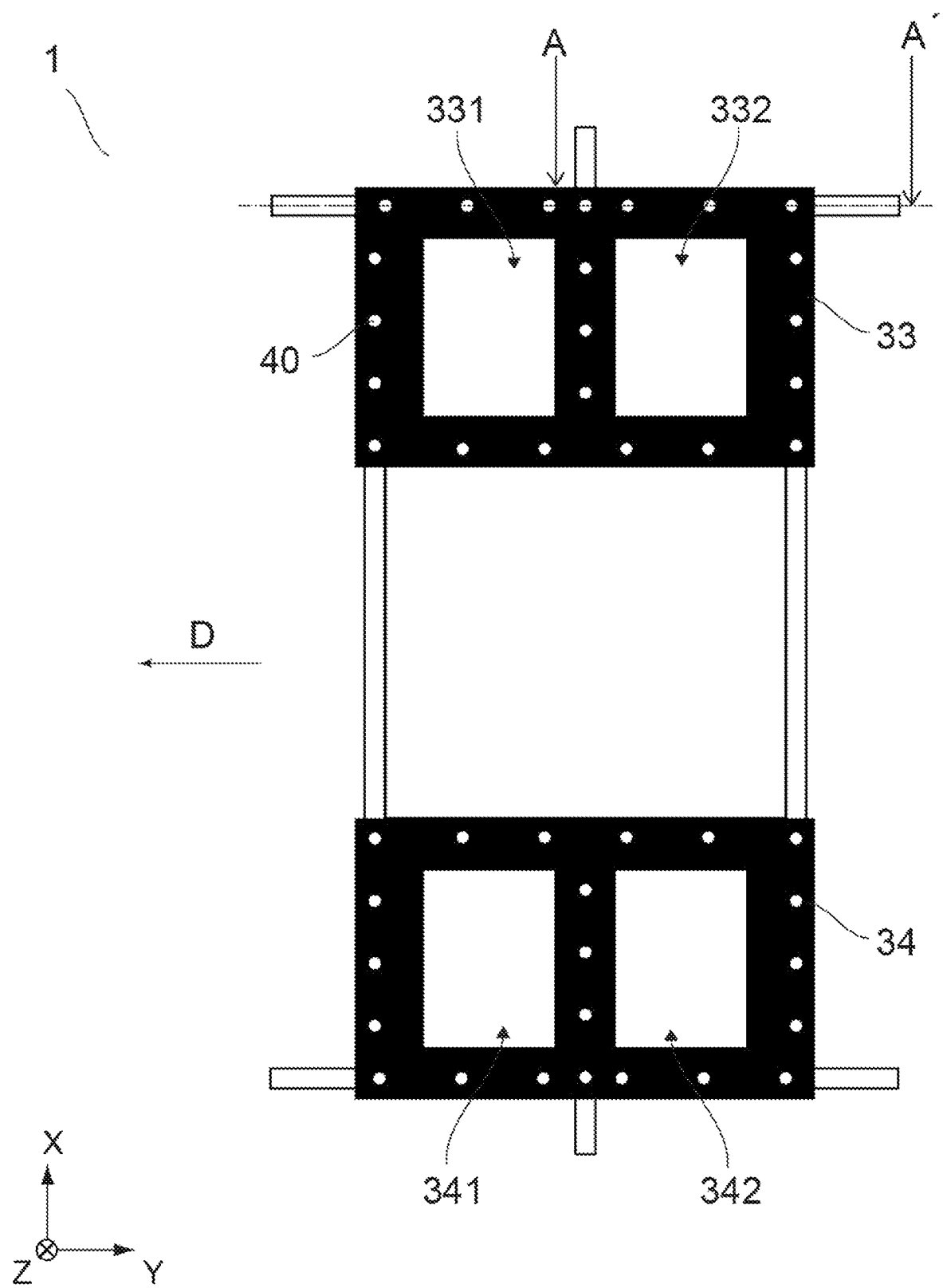
FIG. 4 shows a top view of the frame assembly of FIG. 3.

FIG. 2 and FIG. 4 are top views of frame assembly 1 of this embodiment. In the example of FIG. 2 and FIG. 4, further fixing members 33 and 34 are placed against the fixing members 31 and 32 of the frame assembly 1 shown in FIG. 1. The fixing members 31 and 33 sandwich the frame members 211, 212, 213, 221, 222, and 225. Similarly, fixing members 32 and 34 sandwich frame members 211, 212, 223, 224, and 226. Fixing member 33 is fixed to each of frame members 211, 212, 213, 221, 222, and 225 at multiple locations by fastening fixtures 40. Similarly, fixing member 34 is fixed to each of frame members 211, 212, 223, 224, 226 in multiple locations by fastening fixtures 40.

Figure 5:
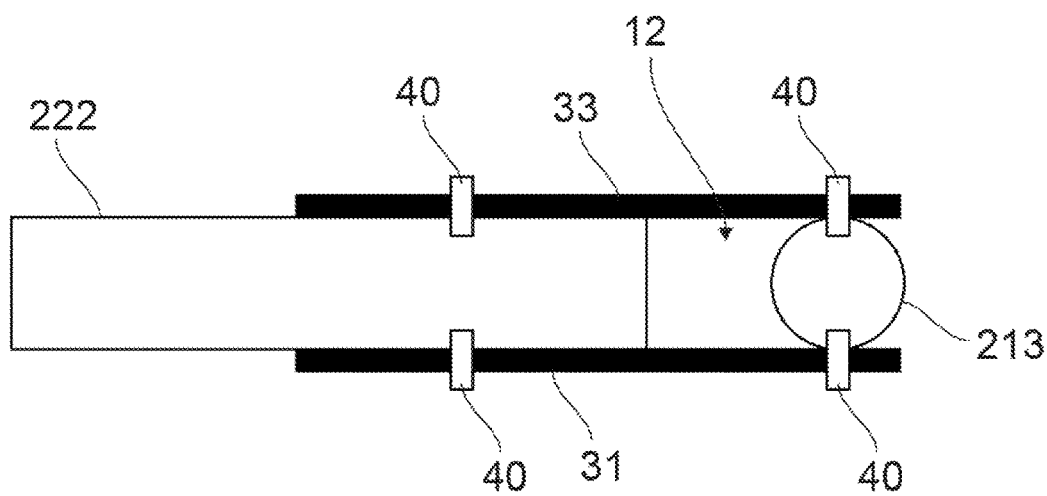
FIG. 5 shows an A-A' sectional view of FIG. 2.

FIG. 5 is an A-A cross-sectional view of FIGS. 2 and 4. Fixing members 31 and 33 are shown fixed to frame member 222 by fastening fixtures 40 and also to frame member 213 by fastening fixtures 40. The end of each frame member may be spaced apart from the other frame members, and in the example in FIG. 3, there is also a gap 12 between the end of frame member 222, 221, and frame member 213.

Returning to FIG. 2, the fixing member 33 is provided with openings 331 and 332. Thus, in the top view of FIG. 2, the fixing member 31 is visible through the openings 331 and 332. Similarly, the frame members are also provided with openings 341 and 342, and the fixing member 32 is visible through the openings 341 and 342 from above the frame assembly 1. When the frame assembly 1 is used for a flight body, control mechanisms, for example, can be placed in the openings 331, 332, 341, and 342.

In the example configuration shown in FIG. 3 and FIG. 4, openings 331, 332, 333, 334, 341, 342, 343, 344 are provided in the fixing members 31, 32, 33, and 34. Thus, as shown in the top view of FIG. 4, the openings are provided through the top and bottom. This makes it possible to reduce weight compared to the case where openings are provided only in the fixing members 31 and 33. It also makes it possible to place equipment or parts that exceed the thickness of the frame assembly 1 in the Z-axis direction by penetrating at least one direction to the frame assembly 1.

Figure 6:
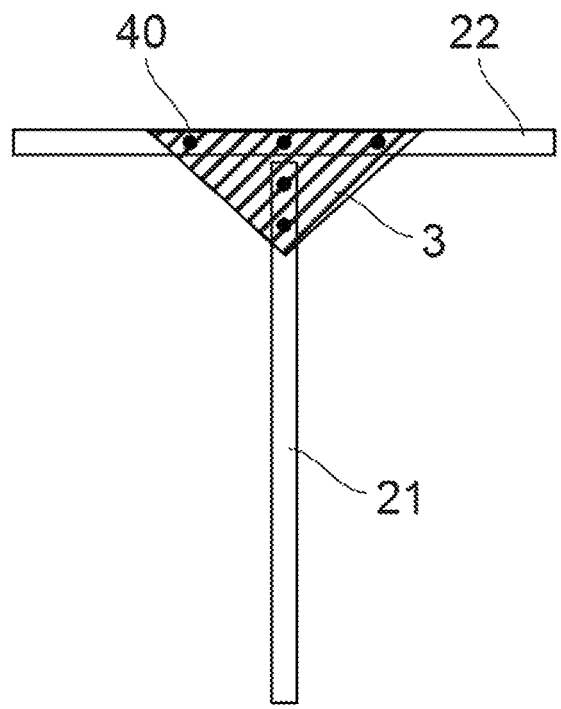
FIG. 6 shows another example of a frame assembly.
Figure 6:
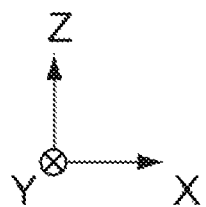

FIG. 6 shows other example of configuration in frame assembly 1. As shown in FIG. 6, the fixing member 3 fixing the plurality of frame members 21 and 22 can be triangular instead of rectangular. The fixing member 3 can also be of any shape. Again, the fixing member 3 is fixed to each of the frame members 21 and 22 by fastening fixtures at several points with fastening fixtures 40.

Figure 7:
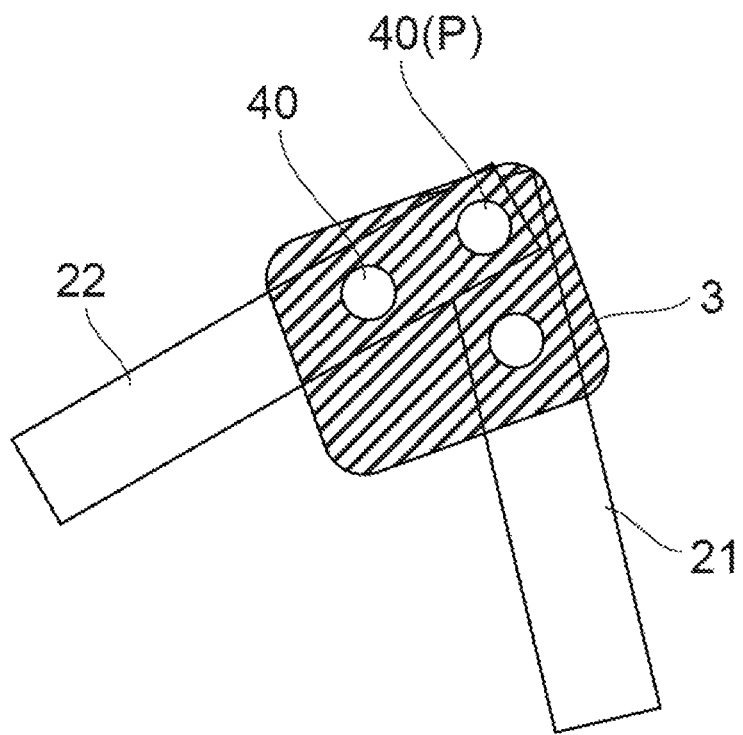
FIG. 7 shows another example of a frame assembly.

FIG. 7 shows other example of configuration in the frame assembly 1. As shown in FIG. 7, the longitudinal direction of the plurality of frame members 21 and 22 need not be vertical. In the example of FIG. 7, the fixing member 3 is also fixed to each of the frame members 21 and 22 at multiple locations by fastening fixtures 40. As shown in FIG. 7, it is also possible to fix two frame members 21 and 22 by fastening fixtures 40 (P) without a gap between the two frame members 21 and 22. In the frame assembly 1 shown in FIG. 1 and FIG. 2, the ends of some or all of the frame members may also be fixed to other frame members.

When a frame member and a fixing member are connected by fastening fixtures, the area where the frame member and the fixing member are in contact becomes as narrow as a point or a line. As a result, load concentration may occur. When used in applications where loads are repeatedly applied, it is desirable to expand the area where the frame member and fixing member are in contact to distribute the load in order to improve durability.

Figure 8:
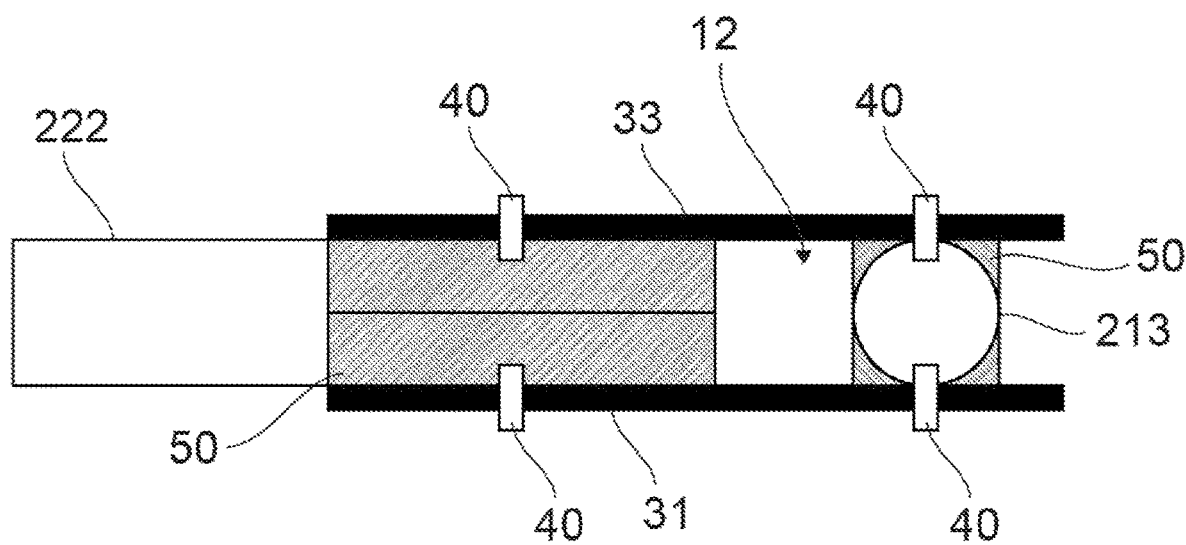
FIG. 8 shows a side view of an example of a reinforcement method for a frame assembly of this embodiment.
Figure 9:
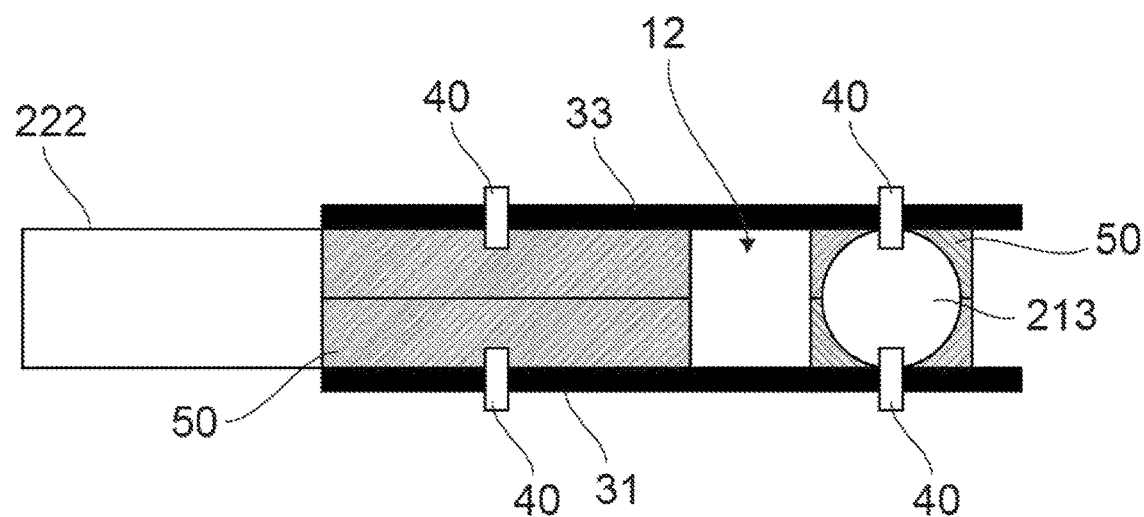
FIG. 9 shows a side view of an example of a reinforcement method for a frame assembly of this embodiment.

As illustrated in FIG. 8 and FIG. 9, a further reinforcement member 50 in a shape (for example, a shape that is substantially wedge-shaped and, when viewed in cross-sectional form, at least one side is horizontal along the surface of the fixing member and at least one other side is an arc along the surface of the frame member) that adheres to both the frame member and the fixing member and is bonded to enable connection by means of a surface. The material of the reinforcement member may be resin, metal, wood, etc., as long as the material has the necessary strength. When using the reinforcement member 50 made of resin, the strength can be further increased by mixing short or long fibers (e.g., carbon fiber, glass wool, Kepler, etc.) when the reinforcement member 50 parts are molded.

Figure 10:
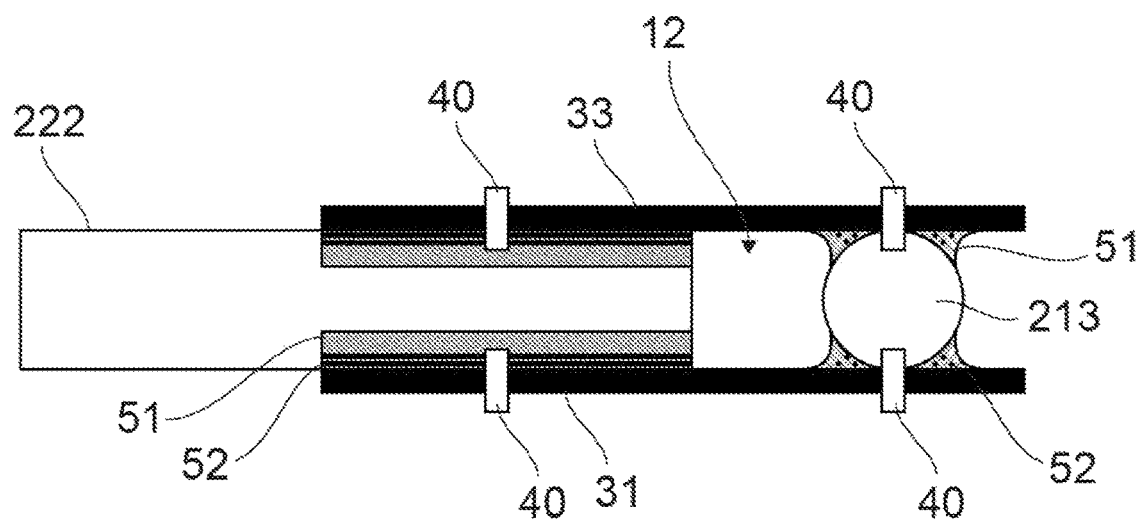
FIG. 10 shows a side view of an example of a reinforcement method for a frame assembly of this embodiment.

In addition to using pre-formed parts made of resin or other materials, there is another method of using reinforcement members as shown in FIG. 10, in which an adhesive is applied and the parts formed by curing of the adhesive are used as reinforcement members 51. The adhesive can be any material or curing method as long as it is generally suitable for bonding the adhered material (in this case, the material used for the surfaces of the frame member and the fixing member). For example, dry solidification, heat curing, chemical reaction, etc. are examples. The adhesive may also be mixed with a fibrous material to act as a scour, or fibrous material 52 may be placed in advance at the point where the adhesive is injected, and the adhesive may be injected there to improve the strength.

When an adhesive that becomes rigid when fully cured (e.g., epoxy resin-based, acrylate-based, etc.) is used, the rigidity of the frame assembly is further improved. When an adhesive that forms an elastic film when fully cured (e.g., silicone resin-based, modified silicone resin-based, epoxy resin-based, acrylic resin-based, rubber-based, urethane-based, etc.) is used, it is possible to provide shock absorption in the event of contact or fall.

<Overview of the Second Embodiment of the Frame Assembly 1>

In the following details of the second embodiment of the frame assembly according to this embodiment of this disclosure, the components that overlap with the first embodiment of the frame assembly 1 can be the same, so the description again will be omitted.

<Configuration of the Second Embodiment of the Frame Assembly 1>

The plate-shaped fixing members 31 and 33, which sandwich the frame members, may be provided with mounting parts such as a battery case, a mechanical plate, stays, etc. (hereinafter collectively referred to as "mounting parts 300"), as shown in FIG. 11-FIG. 14, for example. This facilitates the placement of various parts, etc., connected to the fixing member.

Each of the mounting parts 300 can be made of the same material as the fixing members 31 and 33, or of a different material. If the mounting parts 300 have the same or higher strength than the fixing members, the strength of the frame assembly 1 can be prevented from decreasing or can be increased.

Figure 13:
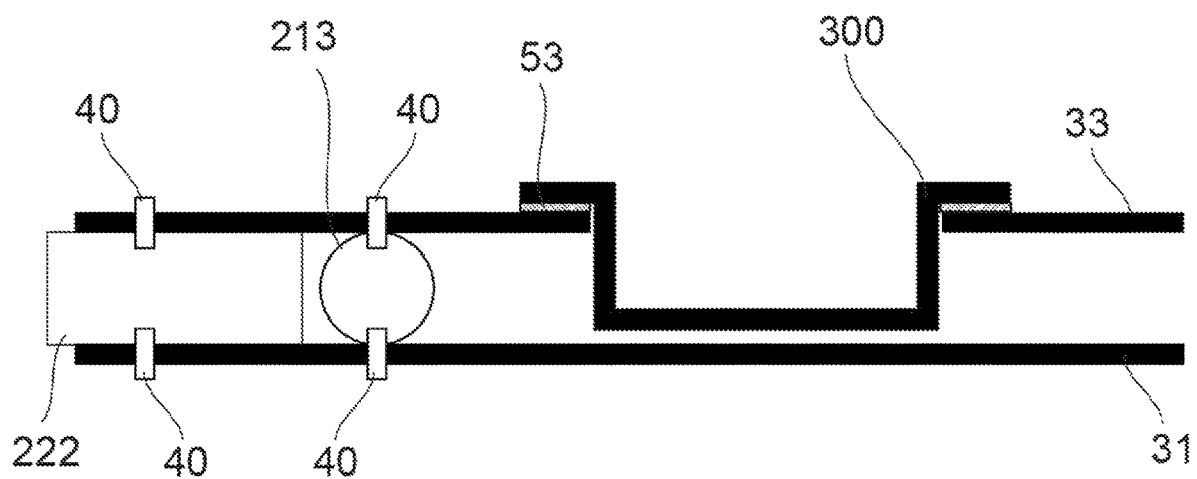
FIG. 13 shows a side view of an example of mounted parts connection of a frame assembly of this embodiment.
Figure 13:
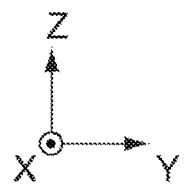

The connection of parts and other components may be made in the same manner as the connection between the frame member and the fixing member, by providing several fixing holes in the fixing member and using 40 fastening fixtures. The method of connection may be any method that can provide the necessary strength, for example, using adhesive member 53, welding, or the like, as shown in FIG. 13.

Figure 15:
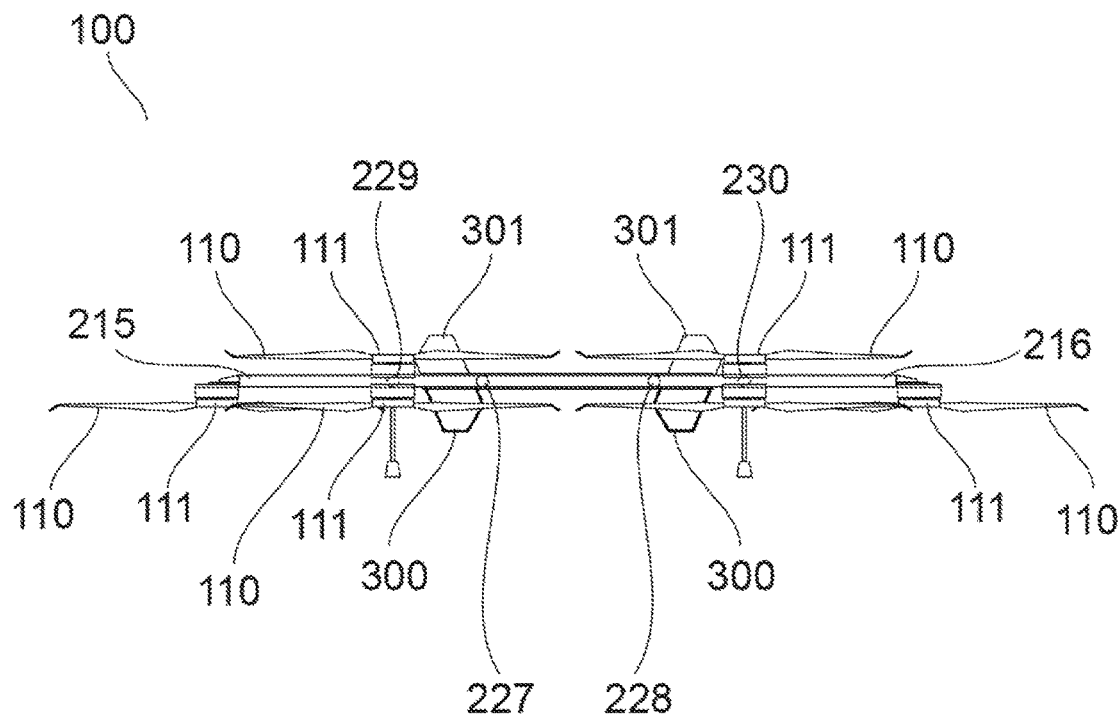
FIG. 15 shows a front view of a flight body using this embodiment of a frame assembly.
Figure 15:
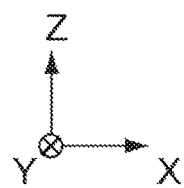
Figure 16:
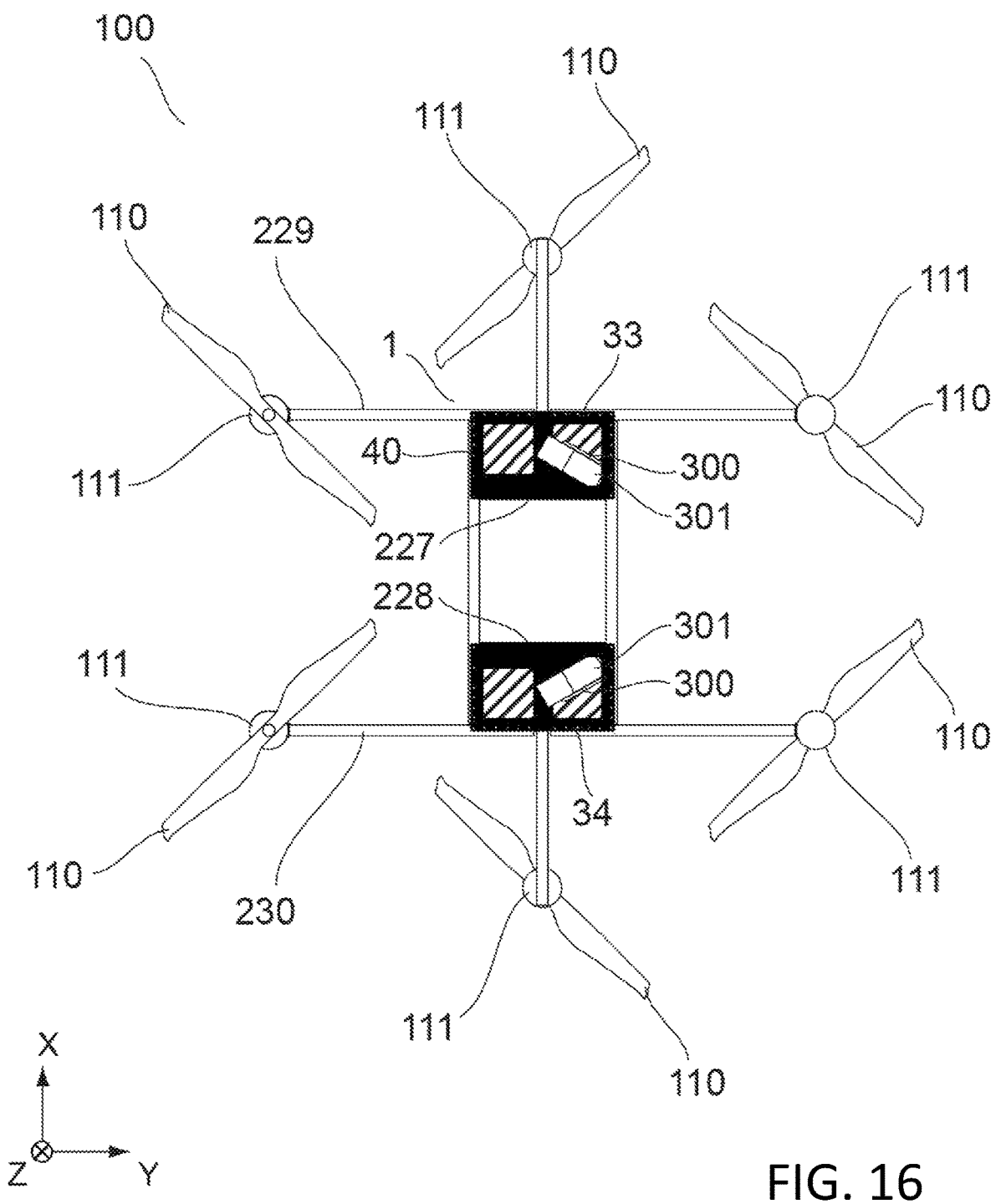
FIG. 16 shows a top view of the flight body of FIG. 15.

The mounting parts 300 connected to the fixing member may be connected above or below the fixing member, or they may be connected to fit within openings in the fixing member. For example, as shown in FIG. 15 and FIG. 16, the battery case can be fitted into the opening and connected so that the battery 301, which is a heavy object, can be located near the center of the frame assembly in the vertical (Z-axis) direction. When connecting the mounted parts 300 to the opening by fitting them within the opening, the opening area is reduced and the frame assembly is expected to be prevented from curving or twisting.

Figure 11:
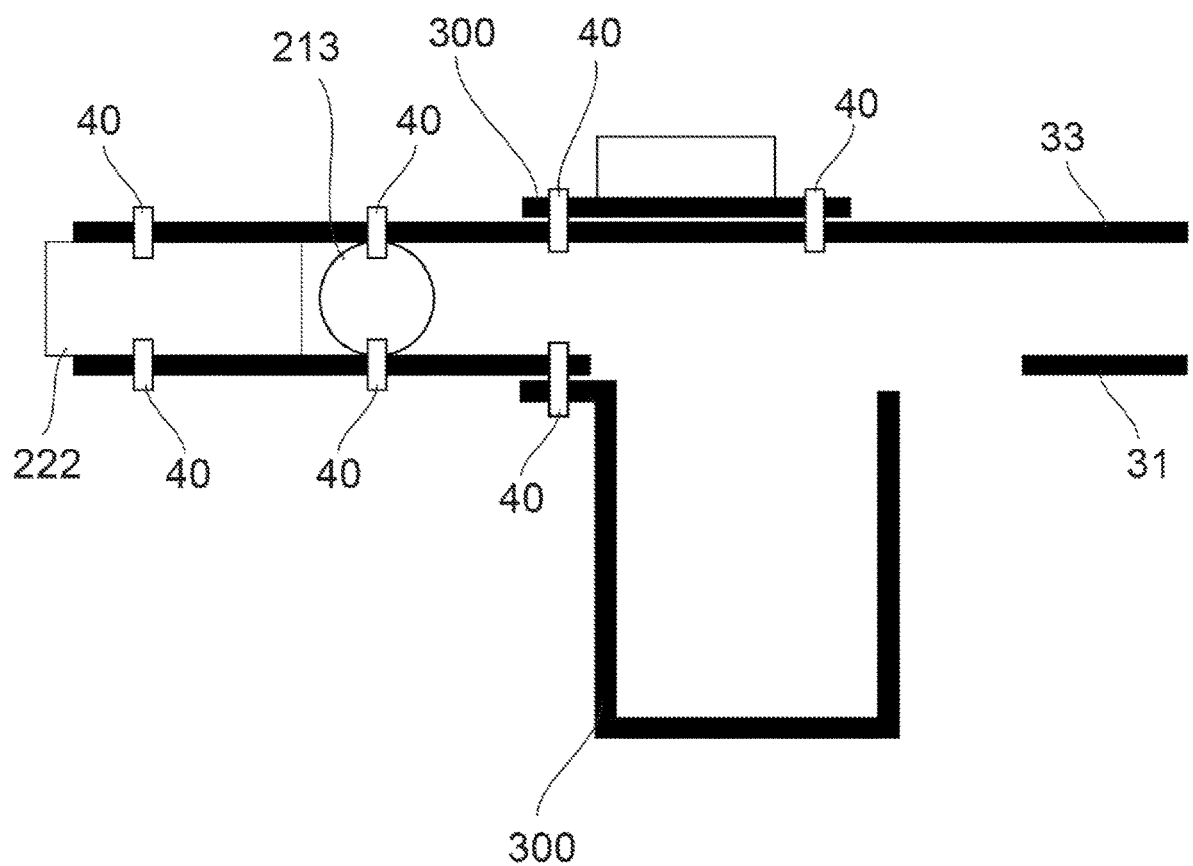
FIG. 11 shows a side view of an example of mounted parts connection of a frame assembly of this embodiment.
Figure 12:
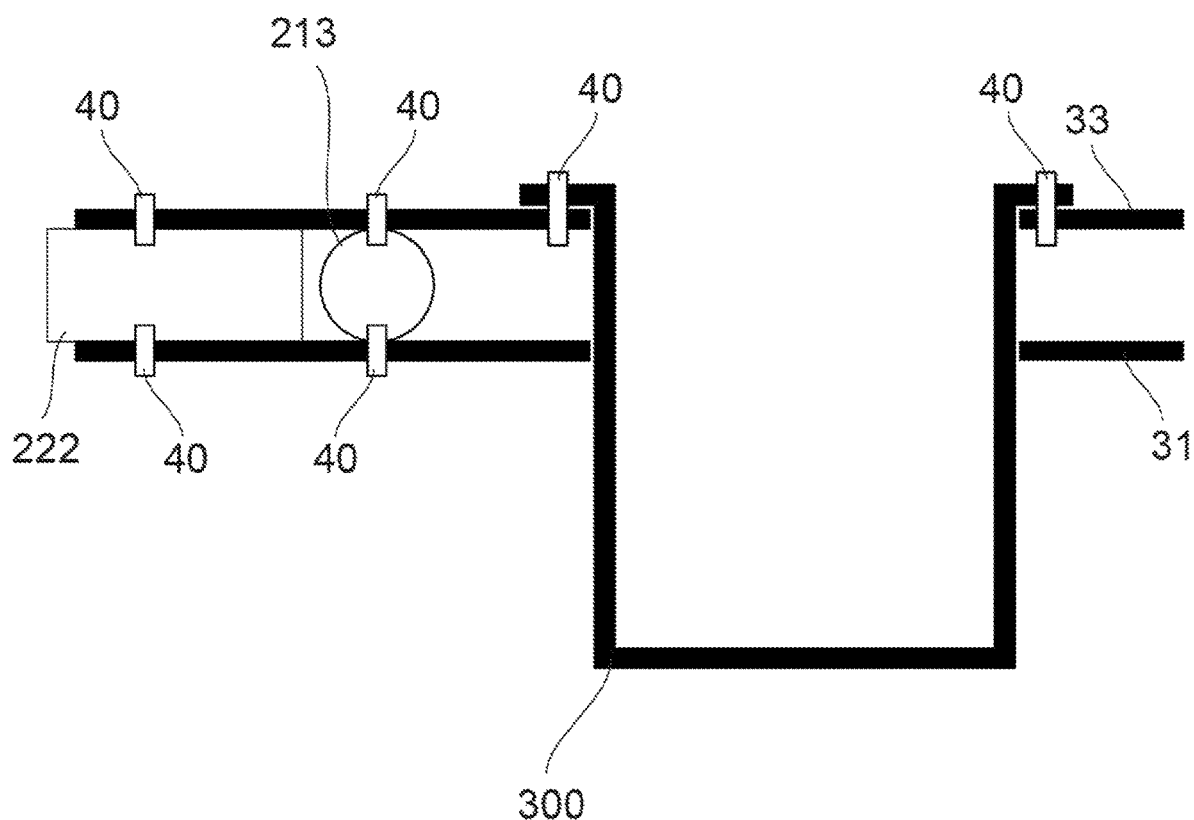
FIG. 12 shows a side view of an example of mounted parts connection of a frame assembly of this embodiment.
Figure 12:
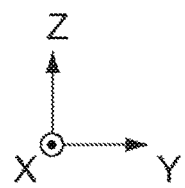

When placing the mounted parts 300 within the opening, the mounted parts may be provided so that they block all of the opening in the top view, or they may be provided so that they partially block the opening as shown in FIG. 11. In addition, multiple mounted parts 300 may be provided within a single opening.

The flight body 100 illustrated in FIG. 15 performs flight by rotating the propeller 110 connected to the motor 111 to generate lift. When moving the body horizontally or performing movements against the wind, the flight body tilts so that the plane of rotation of the propeller 110 is inclined. At this time, if the heavy object is located far from the center of the flight body, the flight body may operate sluggishly.

Figure 14:
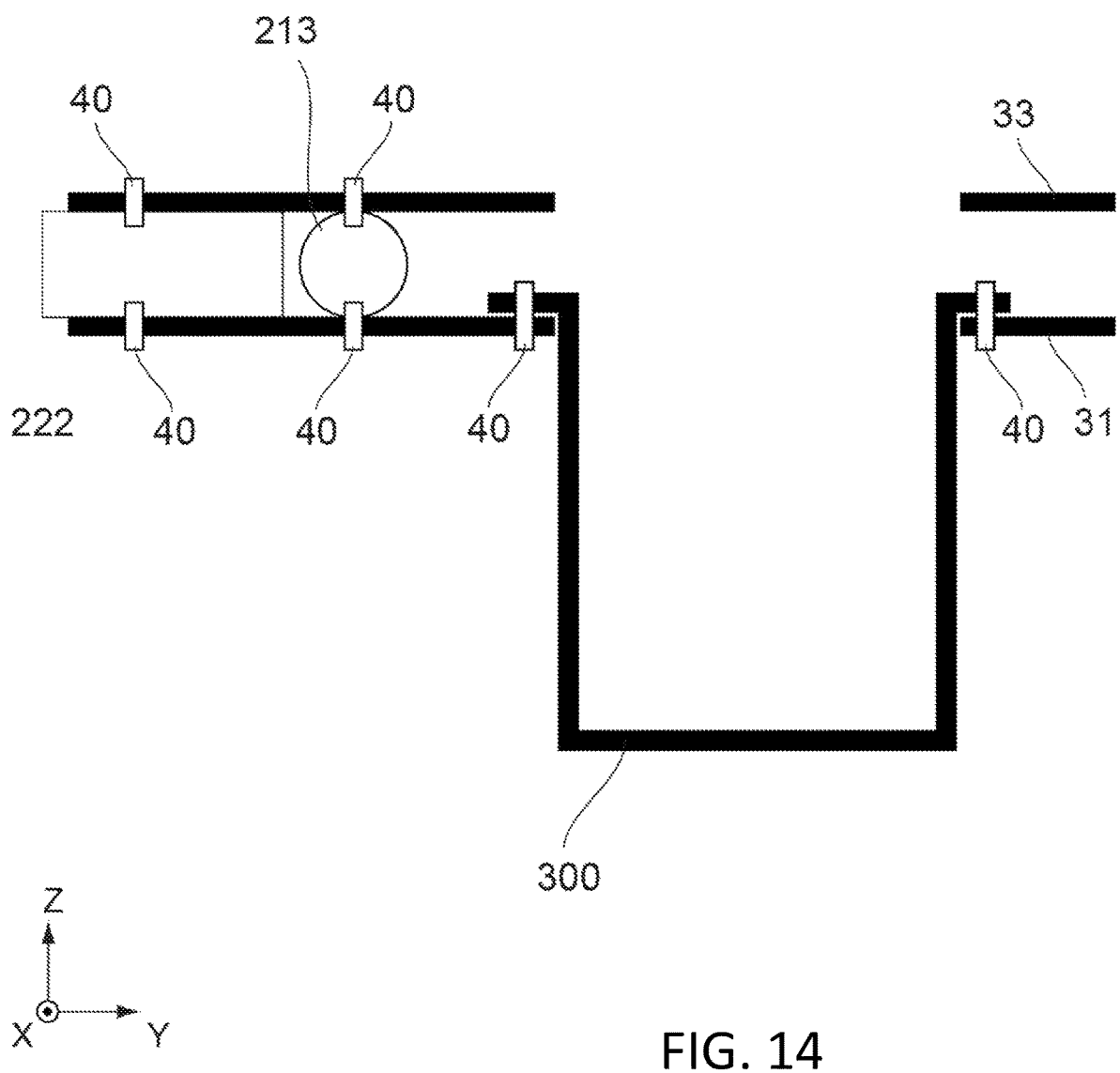
FIG. 14 shows a side view of an example of mounted parts connection of a frame assembly of this embodiment.

The frame assembly used for the flight body 100 comprises a mounting part 300 (battery case) connected to the lower fixing member 31 so that the battery 301 can be mounted, as illustrated in FIG. 14. By gathering heavy objects such as the battery 301 and a cargo/load to be mounted near the center of the flight body, the mass is concentrated, and improved reaction speed and stability can be expected. The center of the flight body is assumed to be the center in any or all of the front-back (X-axis and Y-axis), left-right (X-axis and Y-axis), or vertical (Z-axis) directions. The fixing member 33 is connected to a plurality of frame members, including frame members 229 and 227.

Not only for the purpose of mass centralization, but also by providing openings at any position in the fixing member to allow parts to be mounted, it becomes easier to install each part at the optimum position in the flight body, thereby increasing design flexibility.

The mounting parts 300, such as battery cases, may be provided at an inclination with respect to the direction based on the plane (XY plane) comprising the frame members 21 and 22 comprising the frame assembly 1 and the axis orthogonal to that plane (Z axis). For example, in the frame assembly illustrated in FIG. 15 and FIG. 16, the two mounted parts 300 are provided at an angle inclined to the Z-axis and not parallel to the front-back (Y-axis) direction of the flight body. By narrowing the distance between the two mounting parts 300 toward the rear of the flight body 100 (in the positive Y-axis direction), for example, the airflow from the front to the rear of the flight body 100 can be regulated at the lower part of the flight body 100. Also, for example, by reducing turbulence in the airflow around the flight body 100 (especially below the flight body 100), frame twisting due to unintended airflow may be suppressed or the flight efficiency of the flight body 100 may be improved. In addition, the mounted parts 300 can act as air deflectors, eliminating the need for additional parts for air deflection and reducing the increase in weight of the frame assembly 1.

The direction of inclination of the mounting parts 300 is not limited, for example, they may be inclined in more than two different axial directions. For example, by inclining the mounting parts 300 with respect to other axes, the effect of wind on the flight body from the side can be reduced. In the frame assembly illustrated in FIG. 15, the mounting parts 300 are inclined with the Y axis as the axis of rotation in addition to the inclination described above. The distance between the mounted parts 300 in the left-right (X-axis) direction is narrower from above to below. This allows wind from the side of the flight body 100 to be received by the inclined surfaces of the mounted parts 300. In other words, compared to the case where the battery cases are provided in parallel so that the spacing between the battery cases does not change between the upper and lower parts, the force with which the frame assembly 1 is pushed from the side direction is reduced, and thus unintended collapse of the attitude of the flight body 100 can be suppressed. In the frame assembly 1 illustrated in FIG. 15 and FIG. 16, the mounted parts 300 are inclined in two directions, but the axis of rotation of the inclination may be in one direction or in two or more directions, depending on the shape and application of the flight body.

The configuration of the frame assembly in each embodiment can be combined in various ways. It is desirable to consider suitable configurations according to the cost in manufacturing the frame assembly and the environment and characteristics of the location where the frame assembly is to be operated.

The above mentioned embodiments are merely illustrative to facilitate understanding of the technology and are not intended to limit or interpret the invention. It goes without saying that the invention may be changed and improved without departing from its purpose, and that the invention includes its equivalents.

DESCRIPTION OF REFERENCE NUMERALS

1 Frame assembly
3 Fixing member
21, 22 Frame member
31-34 Fixing member
40 Fastening fixtures
50 Reinforcing member, molded part
51 Reinforcing member, adhesive
52 Fibrous material
53 Adhesives
100 Flight body
110 Propeller
111 Motor
211-216 Frame member
221-230 Frame parts
300 Mounted part

The invention claimed is:

1. A frame assembly for a flight body, comprising:
at least two first frame members extending parallel to each other in a first direction;
a second frame member extending in a second direction perpendicular to the first direction; and
at least two fixing members fixed to the at least two first frame members and the second frame member,
wherein a first fixing member of the at least two fixing members has a first opening and a second fixing member of the at least two fixing members has a second opening, and the first opening and the second opening are substantially parallel and oppose each other, and
a reinforcing member having a shape that adheres to both the at least two fixing members and either the first frame members or the second frame member, the reinforcing member is a resin mixed with fibers.

2. The frame assembly of claim 1,
wherein the at least two fixing members are plate-shaped.

3. The frame assembly according to claim 1,
wherein the first opening or the second opening is configured to receive a mounted part therein.

4. The frame assembly according to claim 2,
wherein the mounted part is a battery case.

5. The frame assembly according to claim 3,
wherein the mounted part is fixed to at least one of the two fixing members and straddles within the first opening or the second opening.

6. The frame assembly according to claim 3,
wherein the mounted part is between the at least two fixing members, at least one of the two fixing members is a lower fixing member, and the mounted part is able to be secured to the lower fixing member.

7. The frame assembly according to claim 5,
wherein the mounted part is angled with respect to a direction defined by a plane comprising the at least two first frame members and the second frame member and an axis orthogonal to the plane.

8. The frame assembly according to claim 3, wherein the mounted part comprises at least two mounted parts.

9. A frame assembly for a flight body, comprising:
at least two first frame members extending parallel to each other in a first direction;
a second frame member extending in a second direction perpendicular to the first direction; and
at least two fixing members fixed to the at least two first frame members and the second frame member,
wherein a first fixing member of the at least two fixing members has a first opening and a second fixing member of the at least two fixing members has a second opening,
the first opening and the second opening are substantially parallel and oppose each other, and
a reinforcing member having a shape that adheres to both the at least two fixing members and either the first frame members or the second frame member, the reinforcing member is an adhesive that becomes rigid when cured.

10. The frame assembly according to claim 9, wherein the adhesive is a mixture of fibers.

11. A frame assembly for a flight body, comprising:
at least two first frame members extending parallel to each other in a first direction;
a second frame member extending in a second direction perpendicular to the first direction; and
at least two fixing members fixed to the at least two first frame members and the second frame member,
wherein a first fixing member of the at least two fixing members has a first opening and a second fixing member of the at least two fixing members has a second opening,
the first opening and the second opening are substantially parallel and oppose each other, and
a reinforcing member having a shape that adheres to both the at least two fixing members and either the first frame members or the second frame member, the reinforcing member is an adhesive that forms a resilient film when cured.

* * * * *